United States Patent
Nakano

(10) Patent No.: US 7,366,539 B2
(45) Date of Patent: Apr. 29, 2008

(54) MOBILE TERMINAL AND METHOD OF OBTAINING WEB CONTENTS THROUGH THE SAME

(75) Inventor: Motoo Nakano, Tokyo (JP)

(73) Assignee: NEC Corporation, Tokyo (JP)

( * ) Notice: Subject to any disclaimer, the term of this patent is extended or adjusted under 35 U.S.C. 154(b) by 228 days.

(21) Appl. No.: 10/882,317

(22) Filed: Jul. 2, 2004

(65) Prior Publication Data

US 2005/0003840 A1 Jan. 6, 2005

(30) Foreign Application Priority Data

Jul. 2, 2003 (JP) ............... 2003-270242

(51) Int. Cl.
- H04M 1/00 (2006.01)
- H04B 1/38 (2006.01)
- H04Q 7/20 (2006.01)
- H04N 7/14 (2006.01)

(52) U.S. Cl. ............... 455/550.1; 455/466; 455/556.2; 455/566; 348/14.01; 348/14.02

(58) Field of Classification Search .. 455/456.1–456.3, 455/456.5, 456.6, 422.1, 418–420, 455, 517, 455/550.1, 554.2, 556.1, 556.2, 432.1, 432.3, 455/557–558, 560–561, 414.1–414.3, 435.1, 455/435.2, 436–440, 466, 2.01, 403, 3.02, 455/515, 412.2, 464, 566; 709/228–229, 709/219, 203; 348/14.02, 14.01; 370/312–313, 370/328–329, 335, 338; 340/14.02, 14.03, 340/729; 725/62
See application file for complete search history.

(56) References Cited

U.S. PATENT DOCUMENTS

| | | | |
|---|---|---|---|
| 6,571,392 B1 * | 5/2003 | Zigmond et al. ........... 725/110 |
| 6,785,716 B1 * | 8/2004 | Nobakht .................... 709/219 |
| 6,892,217 B1 * | 5/2005 | Hanmann et al. ........... 709/200 |
| 6,954,638 B2 * | 10/2005 | Matto ....................... 455/426.1 |
| 2002/0160790 A1 * | 10/2002 | Schwartz et al. ........... 455/456 |
| 2003/0008650 A1 * | 1/2003 | Matsuyama et al. ........ 455/426 |
| 2003/0017839 A1 * | 1/2003 | Mager ....................... 455/550 |
| 2003/0101100 A1 * | 5/2003 | Sako et al. .................. 705/26 |
| 2003/0114145 A1 * | 6/2003 | Boda et al. ................. 455/412 |

(Continued)

FOREIGN PATENT DOCUMENTS

GB  2 370 456 A  6/2002

(Continued)

OTHER PUBLICATIONS

Patent Abstracts of Japan, vol. 2003, No. 5, May 12, 2003 & JP 2003 032754 A, Jan. 31, 2003—Abstract only.

*Primary Examiner*—Meless Zewdu
(74) *Attorney, Agent, or Firm*—Foley & Lardner LLP

(57) ABSTRACT

A mobile terminal having a function of, while a broadcast channel is established, receiving broadcast through the broadcast channel, includes a memory storing an address or addresses of at least one uniform resource locator (URL) relating to the broadcast channel, as a pair with data of the broadcast channel, a judge unit judging whether an address of a uniform resource locator through which access is made to a web content linking to a currently receiving broadcast channel is stored in the memory, and a controller, when the address is judged to be stored in the memory, making access to the web content through the address.

16 Claims, 6 Drawing Sheets

U.S. PATENT DOCUMENTS

| | | | |
|---|---|---|---|
| 2003/0120749 A1* | 6/2003 | Kotzun | 709/218 |
| 2003/0149985 A1* | 8/2003 | Ohno et al. | 725/58 |
| 2004/0049779 A1* | 3/2004 | Sjoblom et al. | 725/13 |
| 2004/0054650 A1* | 3/2004 | Chun | 707/1 |

FOREIGN PATENT DOCUMENTS

| | | | |
|---|---|---|---|
| GB | 2370456 A | | 6/2002 |
| KR | 2003027244 A | * | 4/2003 |

\* cited by examiner

MOBILE TERMINAL AND METHOD OF OBTAINING WEB CONTENTS THROUGH THE SAME

BACKGROUND OF THE INVENTION

1. Field of the Invention

The invention relates to a mobile terminal, a method of obtaining a web content through the mobile terminal, and a program for causing a computer to carry out the method, and more particularly to a mobile terminal having a function of receiving television and radio broadcast, a method of obtaining a web content through the mobile terminal, and a program for causing a computer to carry out the method.

2. Description of the Related Art

With popularization of Internet, a lot of web sites associated with television programs are open. Television programs are watched through a television set, and web sites are watched by a personal computer and the like through Internet.

Recently, some television sets are designed to have a function of watching web sites through Internet. For instance, Japanese Patent Application Publication No. 10-177532 has suggested a method of displaying a web site on a screen of a television set in association with a television program.

In the suggested method, a television program list including uniform resource locators (URLs) of web sites associated with each of television programs is stored into a memory of a television set. By comparing the television program list to data indicative of a channel a television watcher is now watching, a television program which a television watcher is now watching is identified. Then, the television set automatically makes access to a uniform resource locator (URL) stored in the television program list in association with the identified television program.

Japanese Patent Application Publication No. 10-257401 has suggested a method of making access to a web site, based on a uniform resource locator (URL) displayed on a screen of a television set, without necessity for a user to memorize or make a note of the uniform resource locator.

In the suggested method, an image signal obtained from a television circuit and including data indicative of a uniform resource locator is digitized, and then, the thus digitized signal is stored in a memory as digital image data. Then, characters are extracted out of the digital image data. A series of characters including a predetermined word such as "http:" is extracted as uniform resource locator (URL) data. A television set makes access to a web site having the extracted uniform resource locator (URL), through Internet.

However, the firstly mentioned method is accompanied with a problem that it is necessary to incorporate URL data into the television program list, and store the television program list into a memory.

The secondly mentioned method is accompanied with a problem that URL data is necessary to be incorporated into image signals transmitted from an external device.

Some mobile phone terminals are designed to have a function of receiving television programs. However, only when a user watches a document including URL link data, those mobile phone terminals can make access to a web site identified by the URL link data while other function of the mobile phone terminals is in operation. If a user does not watch such a document as mentioned above, a user has to stop a currently operating function, and input an address of a uniform resource locator into his/her mobile phone terminal.

Japanese Patent Application Publication No. 10-145687 has suggested an apparatus for making communication with network, including first means for making communication with network, second means for transmitting image signals, third means for reading network address information out of image signals transmitted from the second means, and fourth means for analyzing the network address information, and selecting network to which an access is made.

Japanese Patent Application Publication No. 11-154131 has suggested a method of establishing communication between a television set and a browser, including the steps of, if images of a television program include a URL address of a WWW server, reading the URL address, and starting up a browser for displaying a homepage identified with the URL address.

Japanese Patent Application Publication No. 11-4416 has suggested a television set which reads URL address data out of a television program, making a list of URL addresses, and making access to a URL address selected in the URL address list.

Japanese Patent Application Publication No. 2002-218346 has suggested a communication device having functions of receiving a television program and making access to a communication network, including first means for transmitting an instruction to make access to a network, second means for storing a time at which the instruction was transmitted and getting the number of a television-broadcast channel selected at that time, third means for extracting address data, based on the time and the number, and fourth means for making access to a network through the extracted address data.

Japanese Patent Application Publication No. 2002-215512 has suggested a system for distributing URL data associated with a television program, including a domestic gateway device for reading data about a television-broadcast channel which a user is now selecting, and a server for distributing URL data of contents associated with the television-broadcast channel, to the user.

Japanese Patent Application Publication No. 2002-108751 has suggested a system for watching data, including first means for watching a web page through a network, second means for reading out predetermined data included in the web page, third means for converting the read-out data into image data to be displayed in a television monitor, and fourth means for outputting the image data to the television monitor.

SUMMARY OF THE INVENTION

In view of the above-mentioned problems in the prior art, it is an object of the present invention to provide a mobile terminal capable of making direct access to a web site associated with a television program now being received, keeping receiving the television program, without inputting a uniform resource locator of the web site thereinto.

It is also an object of the present invention to provide a method of obtaining a web content through a mobile terminal, which method is capable of doing the same as mentioned above.

It is further an object of the present invention to provide a program for causing a computer to carry out the above-mentioned method.

Hereinbelow are described the mobile terminal, the method of obtaining a web content through a mobile terminal, and the program for causing a computer to carry out the method all in accordance with the present invention through the use of reference numerals used in later described embodiments. The reference numerals are indicated only for the purpose of clearly showing correspondence between claims and the embodiments. It should be noted that the reference numerals are not allowed to interpret of claims of the present application.

In one aspect of the present invention, there is provided a mobile terminal having a function of, while a broadcast channel is established, receiving broadcast through the broadcast channel, including a memory storing an address or addresses of at least one uniform resource locator (URL) relating to the broadcast channel, as a pair with data of the broadcast channel, a judge unit judging whether an address of a uniform resource locator through which access is made to a web content linking to a currently receiving broadcast channel is stored in the memory, and a controller, when the address is judged to be stored in the memory, making access to the web content through the address.

In accordance with the present invention, it is possible to make access to a web content associated with a television program which the mobile terminal is now receiving, without necessity for a user to input a uniform resource locator of the web content or selecting the same out of a memory. Thus, the mobile terminal provides enhanced serviceability to a user.

It is preferable that the controller, when the address is judged not to be stored in the memory, stores the address into the memory together with a currently receiving broadcast channel as a pair, and makes access to the web content through the address.

Herein, the broadcast channel includes television channel and/or radio channel.

For instance, the mobile terminal is comprised of a mobile phone.

There is further provided a mobile terminal having a function of, while a broadcast channel is established, receiving broadcast through the broadcast channel, including a memory storing an address or addresses of at least one uniform resource locator (URL) relating to the broadcast channel, as a pair with data of the broadcast channel, an address reader reading an address of a uniform resource locator included in characters displayed in the broadcast, a judge unit judging whether an address of a uniform resource locator through which access is made to a web content linking to a currently receiving broadcast channel is stored in the memory, and a controller, when the address is judged to be stored in the memory, making access to the web content through the address, and stores the address read out by the address reader, into the memory.

The above-mentioned mobile terminal in accordance with the present invention stores therein uniform resource locator addresses associated with television channels, and data relating to each of television channels, as a pair, and is designed to have a function of comparing uniform resource locator addresses stored therein to a television channel which the mobile terminal is now receiving. Hence, even if a uniform resource locator address associated with a television channel which the mobile terminal is now receiving is not input or stored into the mobile terminal, the mobile terminal can get the uniform resource locator address while the mobile terminal is receiving a television program. Thus, a user could have enhanced serviceability. Specifically, when a user would like to make access to a web site linking to a television program which the mobile terminal is now receiving, a user could make access to the web site without necessity to input a uniform resource locator address of the web content or selecting the same out of a memory.

In another aspect of the present invention, there is provided a method of obtaining a web content through a mobile terminal having a function of, while a broadcast channel is established, receiving broadcast through the broadcast channel, including (a) judging whether an address of a uniform resource locator through which access is made to a web content linking to a currently receiving broadcast channel is stored in a memory, based on an address or addresses of at least one uniform resource locator (URL) relating to the broadcast channel, stored in the memory as a pair with data of the broadcast channel, and (b) when the address is judged to be stored in the memory, making access to the web content through the address.

The method may further include the steps of, when the address is judged not to be stored in the memory, storing the address into the memory together with a currently receiving broadcast channel as a pair, and making access to the web content through the address.

There is further provided a method of obtaining a web content through a mobile terminal having a function of, while a broadcast channel is established, receiving broadcast through the broadcast channel, including (a) reading an address of a uniform resource locator included in characters displayed in the broadcast, (b) judging whether an address of a uniform resource locator through which access is made to a web content linking to a currently receiving broadcast channel is stored in a memory, based on an address or addresses of at least one uniform resource locator (URL) relating to the broadcast channel, stored in the memory as a pair with data of the broadcast channel, (c) when the address is judged to be stored in the memory, making access to the web content through the address, and (d) storing the address read out in the step (a), into the memory.

In still another aspect of the present invention, there is provided a program for causing a computer to carry out a method of obtaining a web content through a mobile terminal having a function of, while a broadcast channel is established, receiving broadcast through the broadcast channel, steps executed by the computer in accordance with the program including (a) judging whether an address of a uniform resource locator through which access is made to a web content linking to a currently receiving broadcast channel is stored in a memory, based on an address or addresses of at least one uniform resource locator (URL) relating to the broadcast channel, stored in the memory as a pair with data of the broadcast channel, and (b) when the address is judged to be stored in the memory, making access to the web content through the address.

It is preferable that the steps further include, when the address is judged not to be stored in the memory, storing the address into the memory together with a currently receiving broadcast channel as a pair, and making access to the web content through the address.

There is further provided a program for causing a computer to carry out a method of obtaining a web content through a mobile terminal having a function of, while a broadcast channel is established, receiving broadcast through the broadcast channel, steps executed by the computer in accordance with the program including (a) reading an address of a uniform resource locator included in characters displayed in the broadcast, (b) judging whether an address of a uniform resource locator through which access is made to a web content linking to a currently receiving broadcast channel is stored in a memory, based on an address or addresses of at least one uniform resource locator (URL) relating to the broadcast channel, stored in the memory as a pair with data of the broadcast channel, (c)

when the address is judged to be stored in the memory, making access to the web content through the address, and (d) storing the address read out in the step (a), into the memory.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

Figure 1:
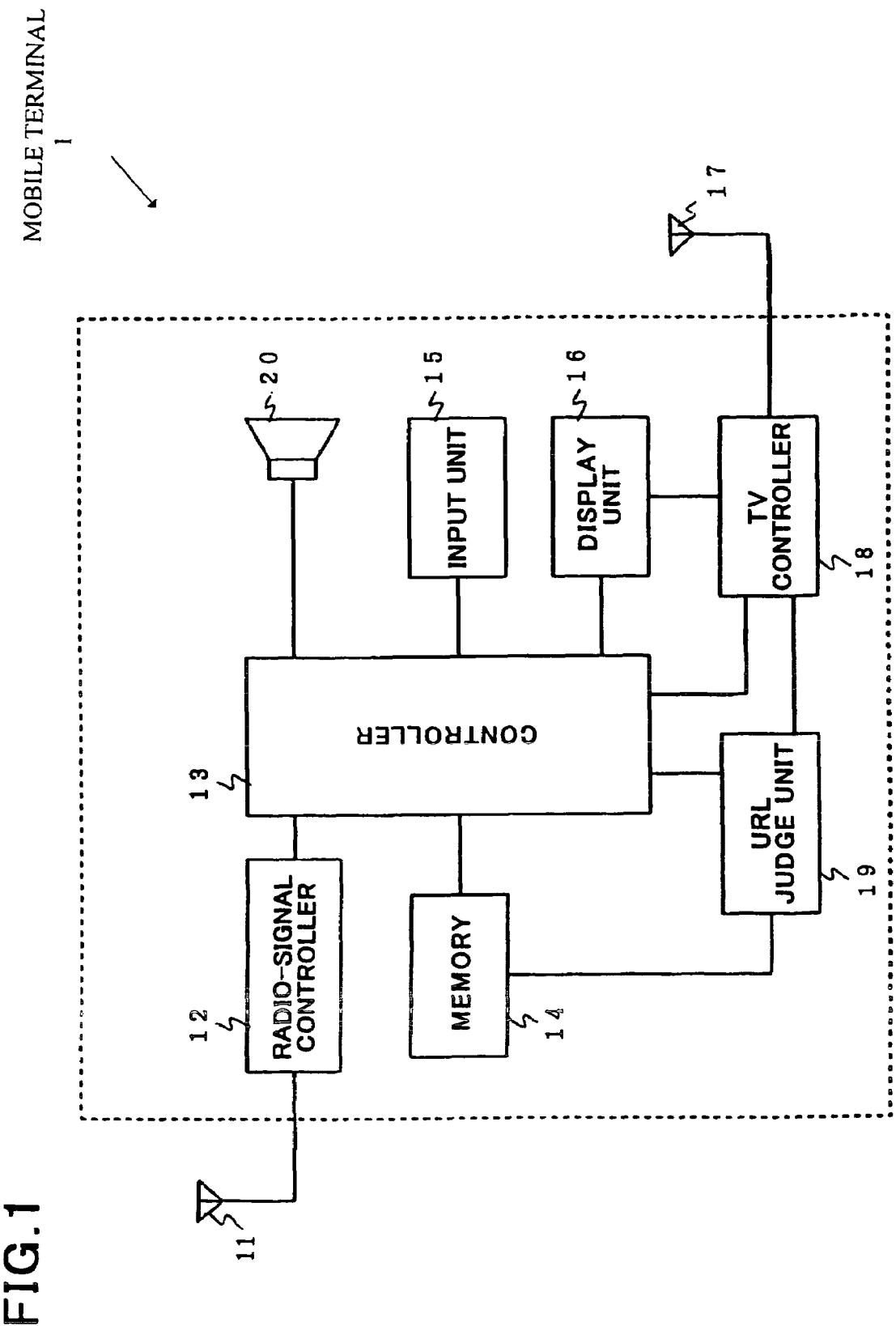
FIG. 1 is a block diagram of the mobile terminal in accordance with the first embodiment of the present invention.

FIG. 1 is a block diagram of the mobile terminal 1 in accordance with the first embodiment of the present invention.

The mobile terminal 1 is comprised of an antenna 11, a radio-signal controller 12, a controller 13, a memory 14, an input unit 15, a display unit 16, a television antenna 17, a television controller 18, a uniform resource locator (URL) judge unit 19, and a speaker 20.

The mobile terminal 1 transmits and receives radio-signals through the antenna 11.

The radio-signal controller 12 modulates radio-signals to be transmitted through the antenna, and demodulates radio-signals having been received through the antenna 11.

The memory 14 stores uniform resource locator (URL) addresses of web sites and a control program to be executed by the controller 13. For instance, the memory 14 is comprised of a semiconductor memory such as a read only memory (ROM), a random access memory (RAM) or an IC memory card, or a storage device such as a flexible disc, a hard disc or an optic magnetic disc.

The controller 13 reads the program out of the memory 14, and executes the program to control an operation of the mobile terminal 1. Thus, the controller 13 operates in accordance with the program stored in the memory 14.

The input unit 15 includes a keyboard through which a user inputs any data into the mobile terminal 1, and a switch by which a user carries out any operation of the mobile terminal 1.

The display unit 16 is comprised of a liquid crystal display device. The display unit 16 displays received television images and/or web contents.

The mobile terminal 1 receives television radio-signals through the television antenna 17. The received television radio-signals are demodulated by the television controller 18.

The URL judge unit 19 identifies a URL address of a web content. An operation of the URL judge unit 19 is explained in detail later.

The speaker 20 outputs voices produced based on voice signals of television broadcast.

Figure 2:
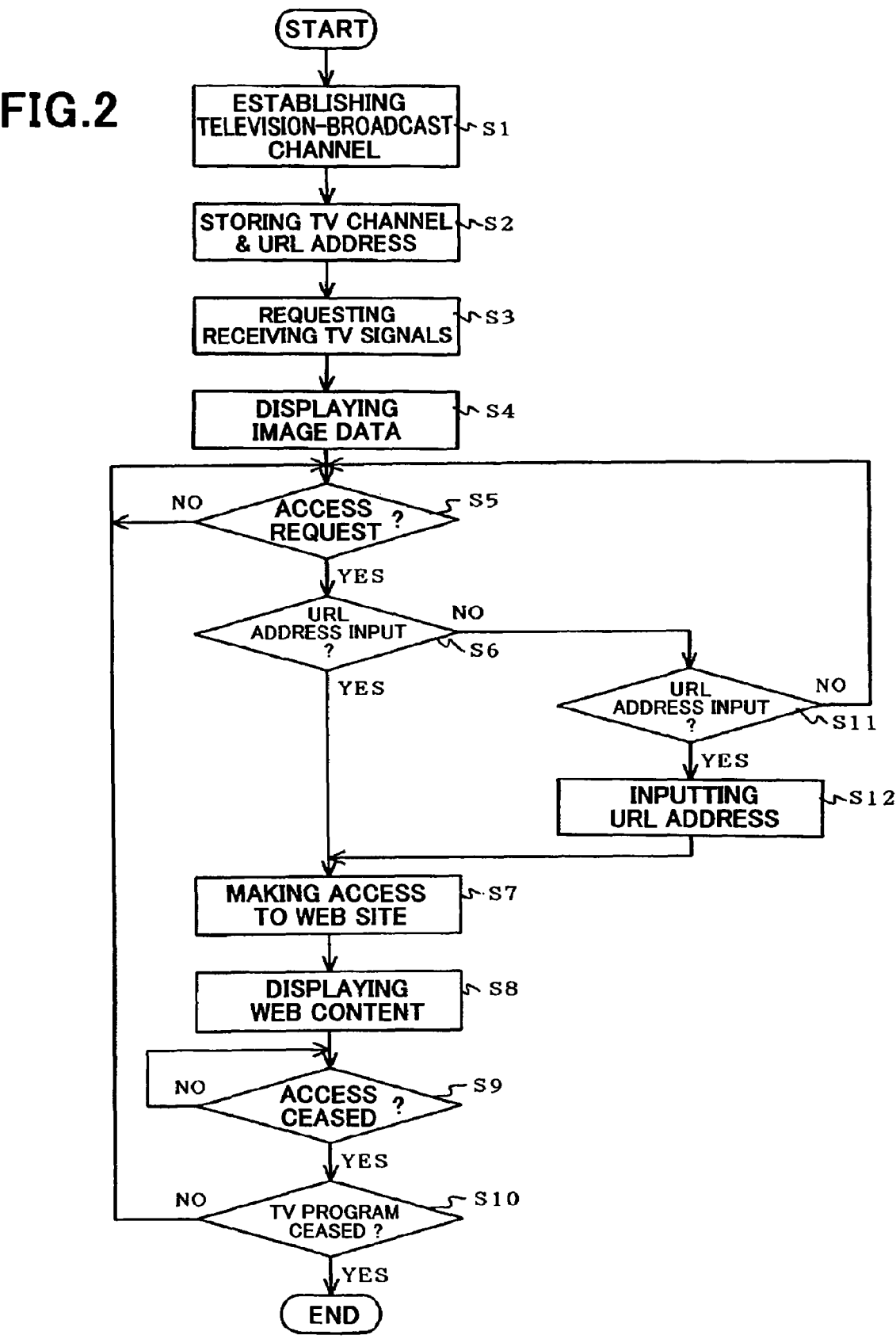
FIG. 2 is a flowchart showing steps to be carried out in the mobile terminal in accordance with the first embodiment of the present invention.

FIG. 2 is a flowchart showing steps to be carried out in the mobile terminal 1. Hereinbelow is explained an operation of the mobile terminal 1 with reference to FIG. 2.

The operation of the mobile terminal 1 explained hereinbelow is accomplished by execution of the program stored in the memory 14 by the controller 13.

A user of the mobile terminal 1 inputs a request of establishing television-broadcast channels through the input unit 15 in order to watch a television program. On receipt of the user's request, the controller 13 starts the television controller 18 for establishing television-broadcast channels, in step S1.

After a television-broadcast channel to be received have been decided, a user inputs a URL address through the input unit 15 in order to make access to a web site liking to a television program which a user is going to watch. The controller 13 transmits the input URL address to the URL judge unit 19.

On receipt of the URL address from the controller 13, the URL judge unit 19 requests the television controller 18 to inform the URL judge unit 19 of a current television-broadcast channel, and then, receives data indicative of the current television-broadcast channel. Then, the URL judge unit 19 stores the received data and the URL address received from the controller 13 into the memory 14 as a pair, in step S2.

After establishment of the television-broadcast channels and storage of a pair of the television-broadcast channel and URL address, a user selects his/her favorite television-broadcast channel through the input unit 15, and inputs a request to start receiving television signals. On receipt of the request, the controller 13 causes the television controller 18 to start receiving television signals, in step S3.

The television controller 18 converts television and voice signals received through the television antenna 17 into image data and voice data, respectively, and then, displays the image data on a screen and outputs voices through the speaker 20, in step S4.

Thus, the mobile terminal 1 starts displaying a television program which a user selected.

Thereafter, a user inputs a request, through the input unit 15, of making access to a web site associated with a television program which is now being displayed on the display unit 16 through the currently receiving television-broadcast channel, in step S5. On receipt of the request (YES in step S5), the controller 13 causes the URL judge unit 19 to judge whether a URL address of a web site associated with a television program which is now being displayed on the display unit 16 has been already input into the memory 14, in step S6.

The URL judge unit 19 receives data indicative of the currently receiving television-broadcast channel from the television controller 18. Then, the URL judge unit 19, based on the currently receiving television-broadcast channel received from the television controller 18, judges whether the URL address of a web site associated with a television program which is now being displayed on the display unit 16 is stored in the memory 14. The URL judge unit 19 transmits the judgment result to the controller 13.

If the URL address is stored in the memory 14 (YES in step S6), the controller 13 starts up a browser to make access to a web site at the URL address transmitted from the URL judge unit 19 together with the judgment result, through the radio-signal controller 12 and the antenna 11, in step S7.

If the URL address is not stored in the memory 14 (NO in step S6), the controller 13 keeps checking whether the URL address is input thereinto by a user through the input unit 15, in step S11, until the URL address is input into the controller 13 through the input unit 15 (step S12). When the URL address is input into the controller 13 by a user in step S12, the controller 13 starts up a browser, in step S7.

The controller 13 transmits web content data received through the antenna 11 and the radio-signal controller 12, to the display unit 16, and causes the display unit 16 to display a web content expressed by the web content data, in step S8.

Then, a user determines whether displaying a web content should be ceased, and inputs his/her decision into the controller 13 through the input unit 15, in step S9.

If a user selects continuation of displaying a web content (NO in step S9), the controller 13 keeps in access with the web site through the radio-signal controller 12 and the antenna 11.

If a user selects to cease displaying a web content (YES in step S9), the controller 13 ceases operation of the browser, and causes the display unit 16 to display television images again through the television-broadcast channel having been selected before an access was made to the web site.

Then, the controller 13 checks whether a user requests to cease watching a television program, in step S10.

If a user selects to cease watching a television program (YES in step S10), the controller 13 causes the television controller 18 to cease receiving television signals. Thus, the television controller 18 stops receiving television signals, and hence, the display unit 16 ends displaying a television program.

After displaying a television program ended, the controller 13 returns back to a condition established before a television program has started, and causes the display unit 16 to display images having been displayed before a television program has started.

In accordance with the first embodiment, a URL address of a web site relating to a television program and data about a television-broadcast channel through which the television program is received are stored in advance as a pair, and the mobile terminal is designed to have a function of comparing a currently receiving television-broadcast channel to a URL address of a web site which a user would like to watch. Thus, it is possible to make access to a user's desired web content associated with a television program which the mobile terminal 1 is now receiving, keeping television signals received, without necessity for a user to input the URL address of the web content or selecting the same out of a memory.

Hence, even if a uniform resource locator address associated with a television-broadcast channel which the mobile terminal 1 is now receiving is not input or stored into the mobile terminal 1, the mobile terminal 1 can get the uniform resource locator address while the mobile terminal 1 is receiving a television program. Thus, a user could have enhanced serviceability.

Second Embodiment

Figure 3:
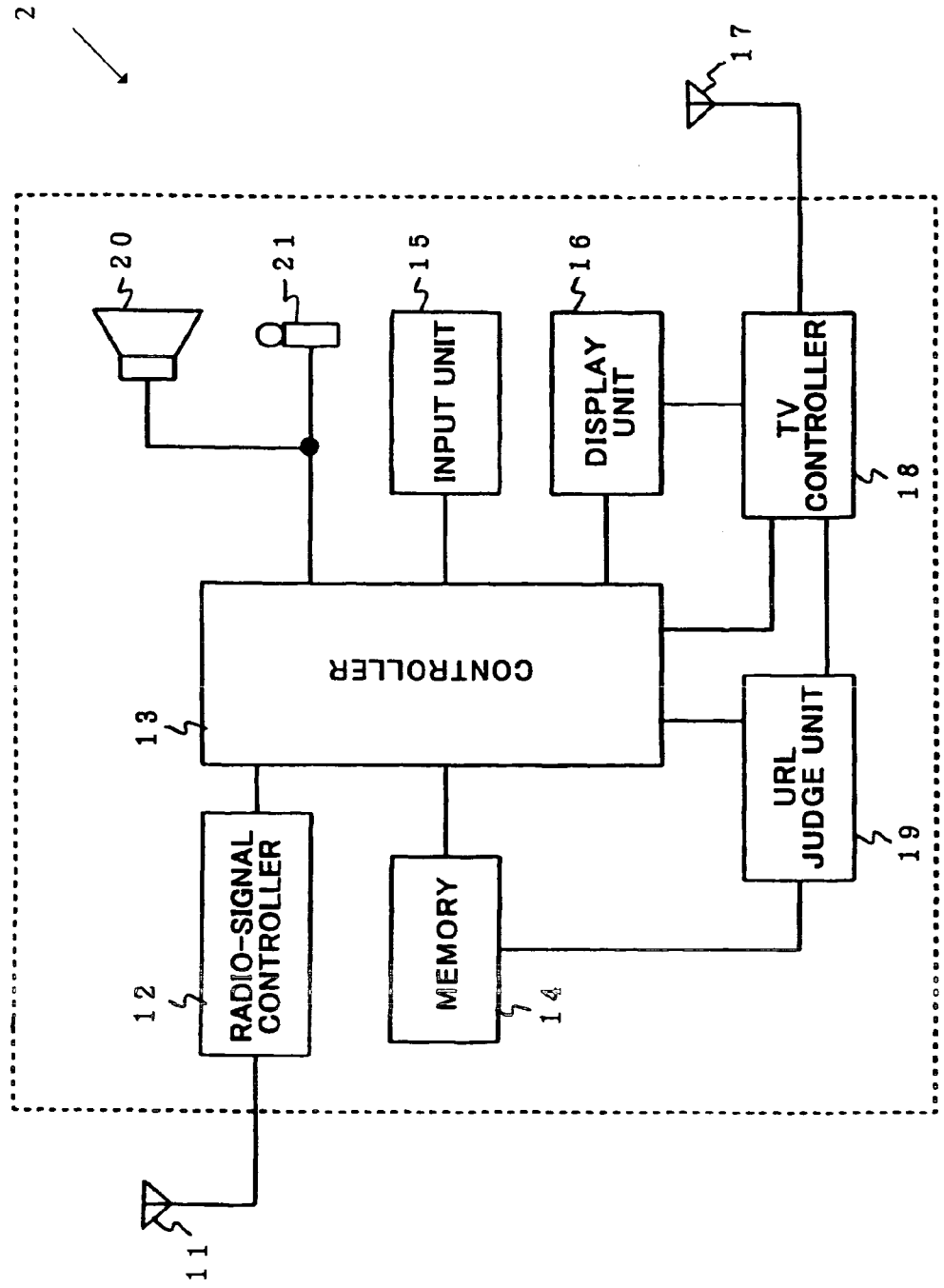
FIG. 3 is a block diagram of the mobile terminal in accordance with the second embodiment of the present invention.

FIG. 3 is a block diagram of a mobile terminal in accordance with the second embodiment of the present invention.

A mobile terminal in accordance with the second embodiment is constructed as a mobile terminal or mobile phone 2. Accordingly, comparing to the structure of the mobile terminal 1 in accordance with the first embodiment, the mobile phone 2 in accordance with the second embodiment is designed to further include a microphone 21 through which the controller 13 receives external voice signals. The mobile phone 2 has the same structure as the structure of the mobile terminal 1 except additionally including the microphone 21. Parts or elements that correspond to the mobile terminal 1 illustrated in FIG. 1 have been provided with the same reference numerals, and operate in the same manner as corresponding parts or elements in the first embodiment.

The speaker 20 in the second embodiment outputs not only voice signals of television broadcast, but also voice signals of a person with which a user now makes communication through the mobile phone 2.

The mobile phone 2 operates in the same way as the mobile terminal 1 in accordance with the first embodiment.

Third Embodiment

Figure 4:
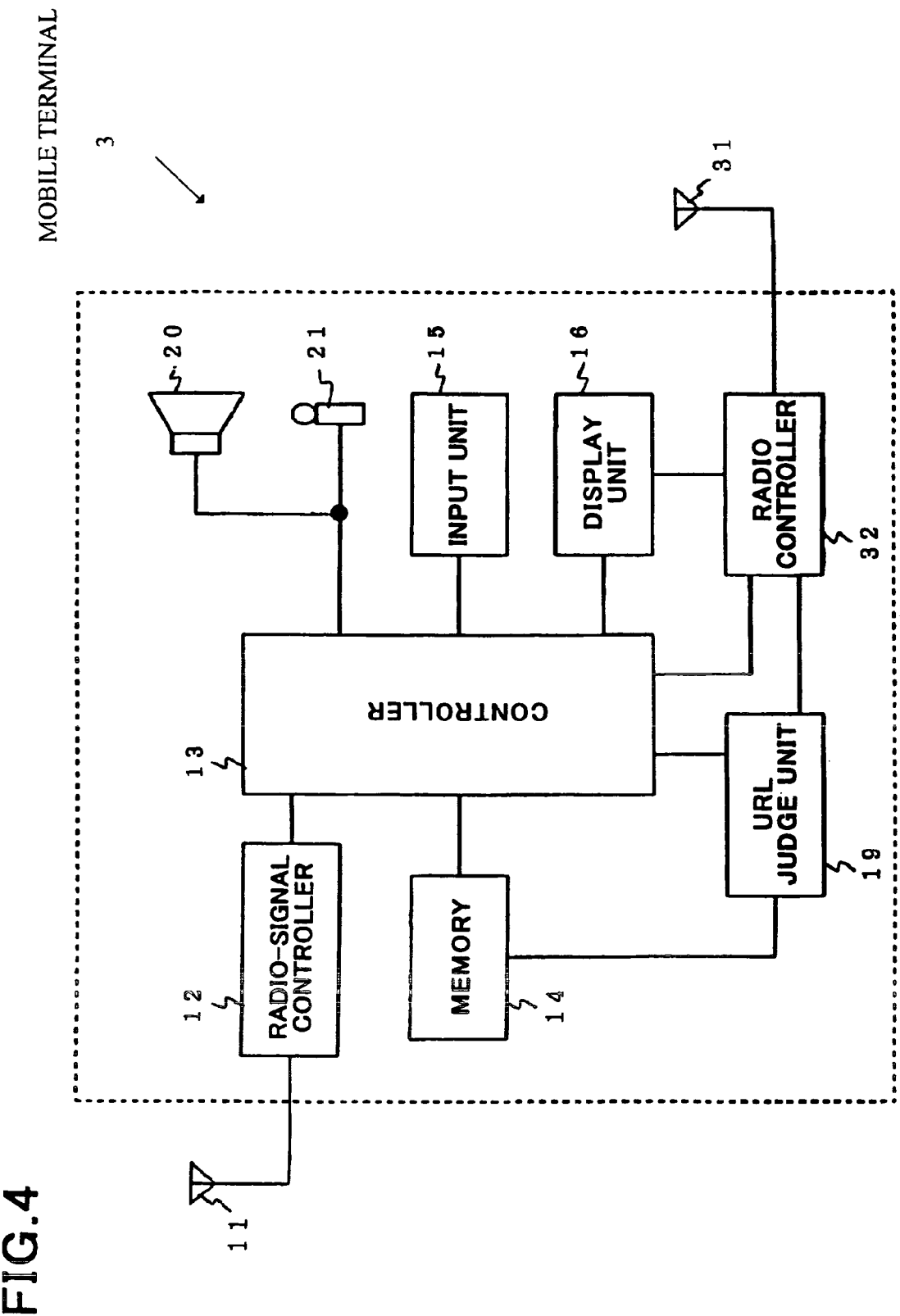
FIG. 4 is a block diagram of the mobile terminal in accordance with the third embodiment of the present invention.

FIG. 4 is a block diagram of a mobile terminal in accordance with the third embodiment of the present invention.

A mobile terminal in accordance with the third embodiment is constructed as a mobile terminal or mobile phone 3. Compared with the structure of the mobile phone 2 in accordance with the second embodiment, the mobile phone 3 in accordance with the third embodiment is designed to include a radio antenna 31 and a radio controller 32 in place of the television antenna 17 and the television controller 18. The mobile phone 3 has the same structure as the structure of the mobile phone 2 except those. Parts or elements that correspond to the mobile phone 2 illustrated in FIG. 3 have been provided with the same reference numerals, and operate in the same manner as corresponding parts or elements in the mobile phone 2.

The mobile phone 3 receives radio-broadcast signals through the radio antenna 31, and the radio controller 32 demodulates the radio-broadcast signals having been received through the radio antenna 31.

Figure 5:
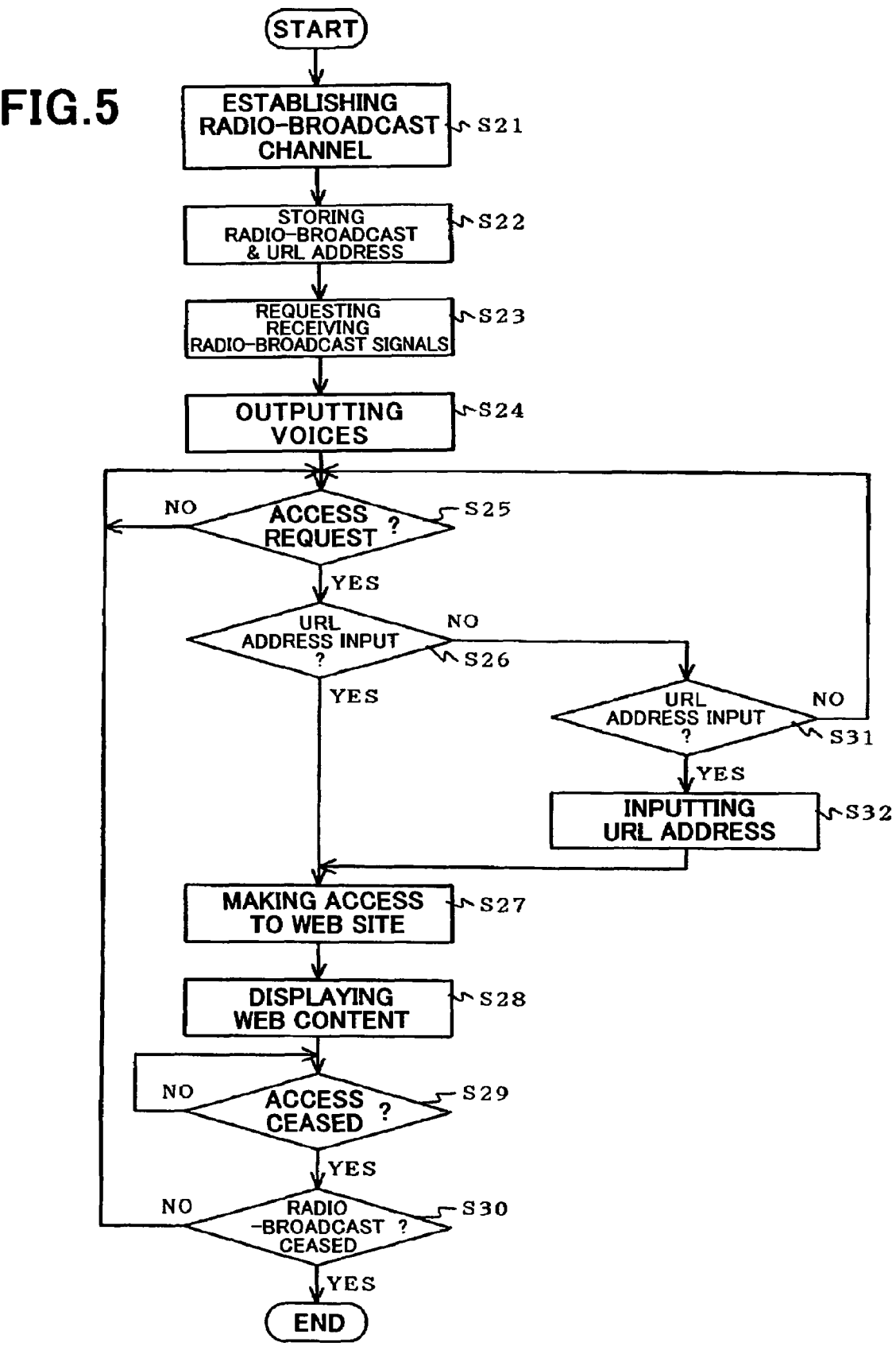
FIG. 5 is a flowchart showing steps to be carried out in the mobile terminal in accordance with the third embodiment of the present invention.

FIG. 5 is a flowchart showing steps to be carried out in the mobile terminal 3. Hereinbelow is explained an operation of the mobile terminal 3 with reference to FIG. 5.

The operation of the mobile terminal 3 explained hereinbelow is accomplished by execution of the program stored in the memory 14 by the controller 13.

A user of the mobile terminal 3 inputs a request of establishing radio-broadcast channels through the input unit 15 in order to listen to a radio-broadcast program. On receipt of the user's request, the controller 13 starts the radio controller 32 for establishing radio-broadcast channels, in step S21.

After a radio-broadcast channel to be received have been decided, a user inputs a URL address through the input unit 15 in order to make access to a web site liking to a radio-broadcast program which a user is going to listen to. The controller 13 transmits the input URL address to the URL judge unit 19.

On receipt of the URL address from the controller 13, the URL judge unit 19 requests the radio controller 32 to inform the URL judge unit 19 of a current radio-broadcast channel, and then, receives data indicative of the current radio-broadcast channel. Then, the URL judge unit 19 stores the received data and the URL address received from the controller 13 into the memory 14 as a pair, in step S22.

After establishment of the radio-broadcast channels and storage of a pair of the radio-broadcast channel and URL address, a user selects his/her favorite radio-broadcast channel through the input unit 15, and inputs a request to start receiving radio-broadcast signals. On receipt of the request, the controller 13 causes the radio controller 32 to start receiving radio-broadcast signals, in step S23.

The radio controller 32 transmits voice data in radio-broadcast signals received through the radio antenna 31, to the speaker 20 through the controller 13, and outputs voices through the speaker 20, in step S24.

The radio controller 32 further causes the display unit 16 to display a message that the mobile phone 3 is now receiving radio-broadcast signals.

Thereafter, a user inputs a request, through the input unit 15, of making access to a web site associated with a radio-broadcast program which is now being received in the mobile phone 3 through the currently receiving radio-broadcast channel. The controller 13 checks whether such a request is input thereinto, in step S25.

On receipt of the request (YES in step S5), the controller 13 causes the URL judge unit 19 to judge whether a URL address of a web site associated with a radio-broadcast program which is now being received has been already input into the memory 14, in step S26.

The URL judge unit 19 receives data indicative of the currently receiving radio-broadcast channel from the radio controller 32. Then, the URL judge unit 19, based on the currently receiving radio-broadcast channel received from the radio controller 32, judges whether the URL address of a web site associated with a radio-broadcast program is stored in the memory 14. The URL judge unit 19 transmits the judgment result to the controller 13.

If the URL address is stored in the memory 14 (YES in step S26), the controller 13 starts up a browser to make access to a web site at the URL address transmitted from the URL judge unit 19 together with the judgment result, through the radio-signal controller 12 and the antenna 11, in step S27.

If the URL address is not stored in the memory 14 (NO in step S26), the controller 13 keeps checking whether the URL address is input thereinto by a user through the input unit 15, in step S31, until the URL address is input into the controller 13 through the input unit 15 (step S32). When the URL address is input into the controller 13 by a user in step S32, the controller 13 starts up a browser, in step S27.

The controller 13 transmits web content data received through the antenna 11 and the radio-signal controller 12, to the display unit 16, and causes the display unit 16 to display a web content expressed by the web content data, in step S28.

Then, a user determines whether displaying a web content should be ceased, and inputs his/her decision into the controller 13 through the input unit 15, in step S29.

If a user selects continuation of displaying a web content (NO in step S29), the controller 13 keeps in access with the web site through the radio-signal controller 12 and the antenna 11.

If a user selects to cease displaying a web content (YES in step S29), the controller 13 ceases operation of the browser, and causes the display unit 16 to display the above-mentioned message.

Then, the controller 13 checks whether a user requests to cease listening to a radio-broadcast program, in step S30.

If a user selects to cease listening to a radio-broadcast program (YES in step S30), the controller 13 causes the radio controller 32 to cease receiving radio-broadcast signals. Thus, the radio controller 32 stops receiving radio-broadcast signals.

Thus, an operation of receiving radio-broadcast signals ends. Thereafter, the controller 13 returns back to its initial condition, and causes the display unit 16 to display images having been displayed before the operation of receiving radio-broadcast signals started.

Fourth Embodiment

Figure 6:
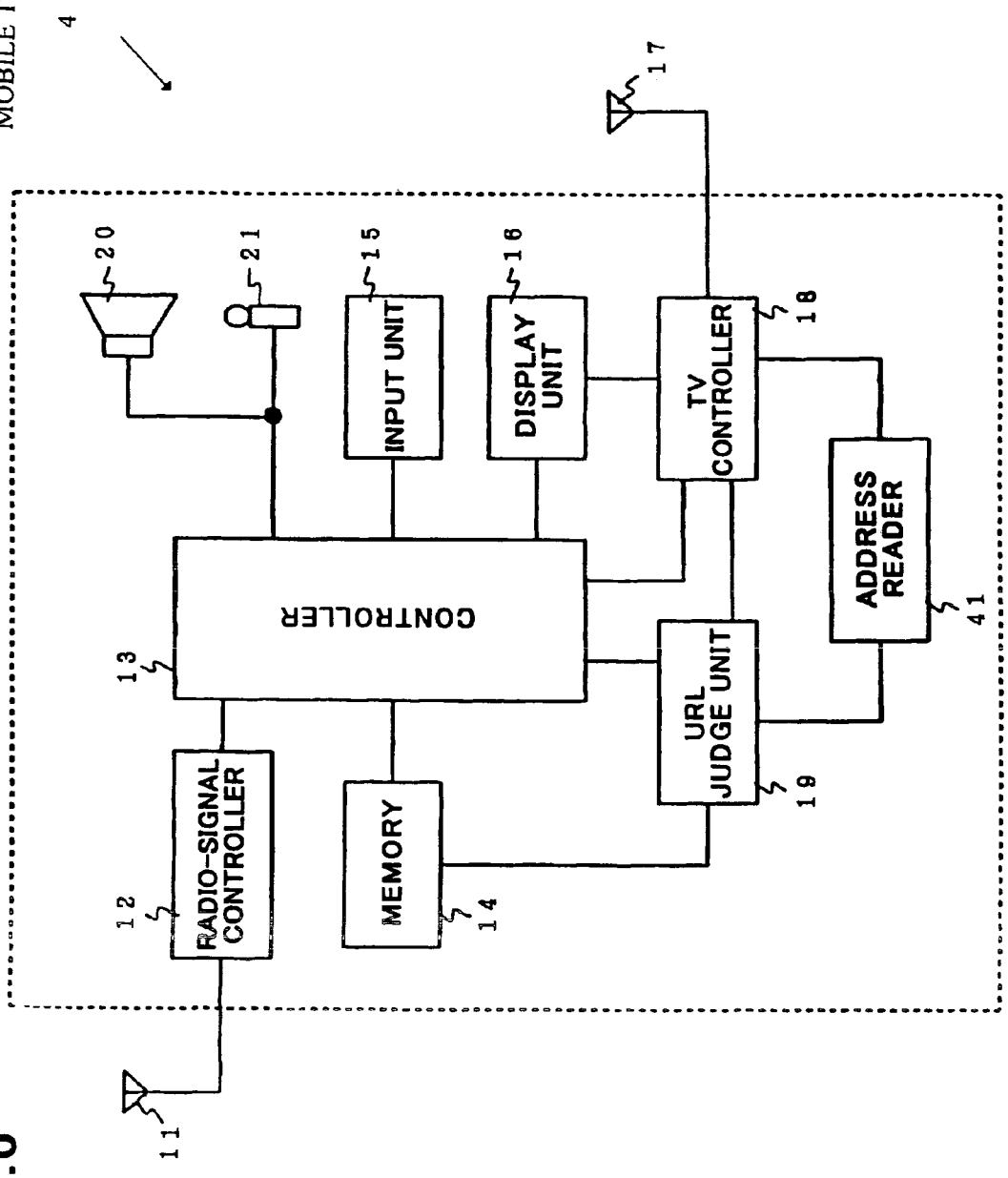
FIG. 6 is a block diagram of the mobile terminal in accordance with the fourth embodiment of the present invention.

FIG. 6 is a block diagram of a mobile terminal in accordance with the fourth embodiment of the present invention.

A mobile terminal in accordance with the fourth embodiment is constructed as a mobile terminal or mobile phone 4. Compared with the mobile phone 2 in accordance with the second embodiment, illustrated in FIG. 3, the mobile phone 4 is designed to further include an address reader 41. The mobile phone 4 has the same structure as the structure of the mobile terminal 2 except additionally including the address reader 41. Parts or elements that correspond to the mobile terminal 2 illustrated in FIG. 3 have been provided with the same reference numerals, and operate in the same manner as corresponding parts or elements of the mobile terminal 2.

The address reader 41 automatically reads a URL address included in characters included in received television-broadcast data, and transmits the read URL address to the URL judge unit 19.

In the above-mentioned first to third embodiments, a user is necessary to input a URL address of a web site associated with a currently received television-broadcast channel in advance or while a television program is being received. In contrast, in the fourth embodiment, the address reader 41 automatically reads out a URL address included in received television-broadcast data, and on receipt of an instruction from a user through the input unit 15, transmits the URL address to the URL judge unit 19. The URL address having been read out by the address reader 41 is stored in the memory 14 together with data indicative of a currently receiving television-broadcast channel, as a pair.

Thus, the mobile phone 4 in accordance with the fourth embodiment makes it no longer necessary for a user to input a URL address associated with a television program into the controller 13 through the input unit 15.

In accordance with the fourth embodiment, even if a user requests to make access to a web site associated with a currently receiving television program though a URL address of the web site is not stored in the memory 14, it would be possible to make direct access to the web site, because the address reader 41 reads out a URL address of the web site associated with a currently receiving television program, and transmits the read-out URL address to the URL judge unit 19.

In the second to fourth embodiment, the present invention is applied to a mobile phone. However, it should be noted that the present invention may be applied to any mobile terminal such as a personal digital assistant (PDA), if it has functions of making communication with Internet and receiving television- and/or radio-broadcast programs.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2003-270242 filed on Jul. 2, 2003 including specification, claims, drawings and summary is incorporated herein by reference in its entirety.

What is claimed is:

1. A mobile terminal for receiving a signal broadcast on a currently selected broadcast channel of a plurality of broadcast channels, the mobile terminal including:
   a memory for storing one or more uniform resource locators each in association with respective data identifying a corresponding broadcast channel of the plurality of broadcast channels;
   a judge unit for determining whether or not the memory is storing, for the currently selected broadcast channel, a uniform resource locator in association with data identifying the currently selected broadcast channel; and
   a controller for accessing web content at a web site specified by the uniform resource locator while the signal is being received when it is determined by the judge unit that said memory is storing the uniform resource locator in association with the data identifying the currently selected broadcast channel, and for checking for user input when it is determined by the judge unit that said memory is not storing the uniform resource locator in association with the data identifying the currently selected broadcast channel;
   said controller for controlling a display unit to display the web content in a case where the web content is accessed, and for controlling the display unit to display a television program specified by the signal in a case where a command is received to cease displaying the web content.

2. The mobile terminal as set forth in claim 1, further includes
   said controller for obtaining a specific uniform resource locator from said user input in a case where said user input is received, storing said specific uniform resource locator into said memory in association with the data identifying the currently selected broadcast channel, and accessing specific web content at a specific web site specified by the specific uniform resource locator.

3. The mobile terminal as set forth in claim 1, wherein each of said plurality of broadcast channels is a television channel.

4. The mobile terminal as set forth in claim 1, wherein the mobile terminal comprises a mobile phone.

5. A mobile terminal for receiving a signal broadcast on a currently selected broadcast channel of a plurality of broadcast channels, the mobile terminal including:
   a memory for storing one or more uniform resource locators each in association with respective data identifying a corresponding broadcast channel of the plurality of broadcast channels;
   an address reader for reading a particular uniform resource locator included in characters transmitted in said signal broadcast on the currently selected broadcast channel;
   a judge unit for determining whether or not the memory is storing, for the currently selected broadcast channel, a uniform resource locator in association with data identifying the currently selected broadcast channel; and
   a controller for accessing web content at a web site specified by the uniform resource locator while the signal is being received, and when it is determined by the judge unit that said memory is storing the uniform resource locator in association with the data identifying the currently selected broadcast channel, and for checking for user input when it is determined by the judge unit that said memory is not storing the uniform resource locator in association with the data identifying the currently selected broadcast channel, and for storing the particular uniform resource locator into said memory in association with the data identifying the currently selected broadcast channel when the particular uniform resource locator is read out by said address reader from the signal;
   said controller for controlling a display unit to display the web content in a case where the web content is for controlling the display unit to display a television program specified by the signal in a case where a command is received to cease displaying the web content.

6. The mobile terminal as set forth in claim 5, further includes
   said controller for obtaining a specific uniform resource locator from said user input in a case where said user input is received and includes the specific uniform resource locator, storing said specific uniform resource locator into said memory in association with the data identifying the currently selected broadcast channel, and accessing specific web content at a specific web site specified by the specific uniform resource locator.

7. The mobile terminal as set forth in claim 5, wherein each of said plurality of broadcast channels is a television channel.

8. The mobile terminal as set forth in claim 5, wherein the mobile terminal comprises a mobile phone.

9. A method in a mobile terminal, the method comprising:
   receiving a signal broadcast on a currently selected broadcast channel of a plurality of broadcast channels;
   displaying, in a screen of the mobile terminal, a television program specified by the signal;
   determining, while the television program is displayed in the screen of the mobile terminal, whether or not a memory of the mobile terminal is storing, for the currently selected broadcast channel, a uniform resource locator in association with data identifying the currently selected broadcast channel;
   obtaining, when it is determined that said memory is storing the uniform resource locator in association with the data identifying the currently selected broadcast channel, web content from a web site specified by the uniform resource locator;
   checking for user input when it is determined that said memory is not storing the uniform resource locator in association with the data identifying the currently selected broadcast channel;

displaying the web content in the screen of the mobile terminal in a case where the web content is obtained; and displaying, in the screen of the mobile terminal, the television program specified by the signal in a case where a command is received to cease displaying the web content.

10. The method as set forth in claim 9, said checking for user input, comprising:

obtaining from a user, when it is determined that said memory is not storing the uniform resource locator in association with the data identifying the currently selected broadcast channel, a specific uniform resource locator;

storing said specific uniform resource locator into said memory in association with the data identifying the currently selected broadcast channel; and accessing specific web content at a specific web site specified by the specific uniform resource locator.

11. A method in a mobile terminal, the method comprising:

receiving a signal broadcast on a currently selected broadcast channel of a plurality of broadcast channels;

reading a particular uniform resource locator included in characters transmitted in said signal broadcast on the currently selected broadcast channel;

displaying, in a screen of the mobile terminal, a television program specified by the signal;

determining, while the television program is displayed in the screen of the mobile terminal, whether or not a memory of the mobile terminal is storing, for the currently selected broadcast channel, a uniform resource locator in association with data identifying the currently selected broadcast channel;

obtaining, when it is determined that said memory is storing the uniform resource locator in association with the data identifying the currently selected broadcast channel, web content from a web site specified by the uniform resource locator;

checking for user input when it is determined that said memory is not storing the uniform resource locator in association with the data identifying the currently selected broadcast channel;

storing said particular uniform resource locator into said memory in association with the data identifying the currently selected broadcast channel;

displaying the web content in the screen of the mobile terminal in a case where the web content is obtained; and displaying, in the screen of the mobile terminal, the television program specified by the signal in a case where a command is received to cease displaying the web content.

12. The method as set forth in claim 11, said checking for user input comprising:

obtaining from a user, when it is determined that said memory is not storing the uniform resource locator in association with the data identifying the currently selected broadcast channel, a specific uniform resource locator;

storing said specific uniform resource locator into said memory in association with the data identifying the currently selected broadcast channel; and accessing specific web content at a specific web site specified by the specific uniform resource locator.

13. A computer-readable storage medium storing a computer program for causing a computing device in a mobile terminal to carry out a process while the mobile terminal is receiving a signal broadcast on a currently selected broadcast channel of a plurality of broadcast channels, the process comprising:

displaying, in a screen of the mobile terminal, a television program specified by the signal;

determining, while the television program is displayed in the screen of the mobile terminal, whether or not a memory of the mobile terminal is storing, for the currently selected broadcast channel, a uniform resource locator in association with data identifying the currently selected broadcast channel;

obtaining, when it is determined that said memory is storing the uniform resource locator in association with the data identifying the currently selected broadcast channel, web content from a web site specified by the uniform resource locator;

checking for user input when it is determined that said memory is not storing the uniform resource locator in association with the data identifying the currently selected broadcast channel;

displaying the web content in the screen of the mobile terminal in a case where the web content is obtained; and displaying, in the screen of the mobile terminal, the television program specified by the signal in a case where a command is received to cease displaying the web content.

14. The computer-readable storage medium as set forth in claim 13, wherein said checking for user input comprises:

obtaining from a user, when it is determined that said memory is not storing the uniform resource locator in association with the data identifying the currently selected broadcast channel, a specific uniform resource locator;

storing said specific uniform resource locator into said memory in association with the data identifying the currently selected broadcast channel; and accessing specific web content at a specific web site specified by the specific uniform resource locator.

15. A computer-readable storage medium storing a computer program for causing a computing device in a mobile terminal to carry out a process while the mobile terminal is receiving a signal broadcast on a currently selected broadcast channel of a plurality of broadcast channels, the process comprising:

displaying, in a screen of the mobile terminal, a television program specified by the signal;

reading a transmitted uniform resource locator included in characters transmitted in said signal broadcast on the currently selected broadcast channel;

determining, while the television program is displayed in the screen of the mobile terminal, whether or not a memory of the mobile terminal is storing, for the currently selected broadcast channel, a uniform resource locator in association with data identifying the currently selected broadcast channel;

obtaining, when it is determined that said memory is storing the uniform resource locator in association with the data identifying the currently selected broadcast channel, web content from a web site specified by the uniform resource locator;

checking for user input when it is determined that said memory is not storing the uniform resource locator in association with the data identifying the currently selected broadcast channel;

storing said transmitted uniform resource locator into said memory in association with the data identifying the currently selected broadcast channel;

displaying the web content in the screen of the mobile terminal in a case where the web content is obtained; and displaying, in the screen of the mobile terminal, the television program specified by the signal via a case where a command is received to cease displaying the web content.

16. The computer-readable storage medium as set forth in claim 15, wherein said checking for user input comprises:

obtaining from a user, when it is determined that said memory is not storing the uniform resource locator in association with the data identifying the currently selected broadcast channel, a specific uniform resource locator;

storing said specific uniform resource locator into said memory in association with the data identifying the currently selected broadcast channel; and accessing specific web content at a specific web site specified by the specific uniform resource locator.

* * * * *